US011256612B2

(12) United States Patent
Ishay et al.

(10) Patent No.: US 11,256,612 B2
(45) Date of Patent: Feb. 22, 2022

(54) AUTOMATED TESTING OF PROGRAM CODE UNDER DEVELOPMENT

(71) Applicant: MICRO FOCUS LLC, Santa Clara, CA (US)

(72) Inventors: Sigal Ishay, Yehud (IL); Ilan Shufer, Yehud (IL); Sharon Lin, Yehud (IL)

(73) Assignee: MICRO FOCUS LLC, Santa Clara, CA (US)

(*) Notice: Subject to any disclaimer, the term of this patent is extended or adjusted under 35 U.S.C. 154(b) by 0 days.

(21) Appl. No.: 16/864,429

(22) Filed: May 1, 2020

(65) Prior Publication Data

US 2021/0342258 A1 Nov. 4, 2021

(51) Int. Cl.
*G06F 9/44* (2018.01)
*G06F 11/36* (2006.01)

(52) U.S. Cl.
CPC ...... *G06F 11/3692* (2013.01); *G06F 11/3664* (2013.01); *G06F 11/3688* (2013.01)

(58) Field of Classification Search
CPC ............ G06F 11/3692; G06F 11/3664; G06F 11/3688
See application file for complete search history.

(56) References Cited

U.S. PATENT DOCUMENTS

| | | | |
|---|---|---|---|
| 9,141,920 B2 | 9/2015 | Dunne et al. | |
| 9,183,124 B2 | 11/2015 | Brown et al. | |
| 9,519,477 B2 | 12/2016 | Champlin-Scharff et al. | |
| 9,612,821 B2 | 4/2017 | Iyer et al. | |
| 9,921,952 B2 | 3/2018 | Dean et al. | |
| 2006/0107121 A1* | 5/2006 | Mendrala | G06F 11/3688 714/38.1 |
| 2006/0136784 A1* | 6/2006 | Prescott | G06F 11/0748 714/38.11 |
| 2007/0074149 A1* | 3/2007 | Ognev | G06F 11/366 717/101 |
| 2010/0191731 A1* | 7/2010 | Rus | G06F 16/355 707/737 |
| 2015/0378874 A1* | 12/2015 | Prasad | G06F 11/3692 717/124 |
| 2016/0371173 A1* | 12/2016 | Ignatyev | G06F 11/3688 |

OTHER PUBLICATIONS

Blackburn et al. (Why Model-Based Test Automation is Different and What You Should Know to Get Started, International Conference on Practical Software Quality, 2004).*

(Continued)

*Primary Examiner* — Hang Pan

(57) ABSTRACT

Automated test failures that result from automated testing of program code under development are windows to include just the automated test failures occurring for a first time and that are due to automated test code defects or program code defects. The automated test failures that remain after winnowing are clustered into automated test failure clusters that each individually corresponding to a different automated test code defect or a different program code defect. The automated test failure clusters are window to include just the automated test failure clusters that each individually correspond to a different program code defect. The automated test failure clusters that remain after winnowing are output.

20 Claims, 5 Drawing Sheets

(56) References Cited

OTHER PUBLICATIONS

Zhang et al., "A variable-Level Automated Defect Identification Model Based on Machine Learning", Soft Computing (2020) 24:1045-1061, Mar. 23, 2019.

"Defect Management process: How to manage a defect effectively", Nov. 10, 2019, https://www.softwaretestinghelp.com/defect-management-process/.

"The Benefits of early defect detection in software development", 2020 <https://www.castsoftware.com/glossary/early-defect-detection>.

* cited by examiner

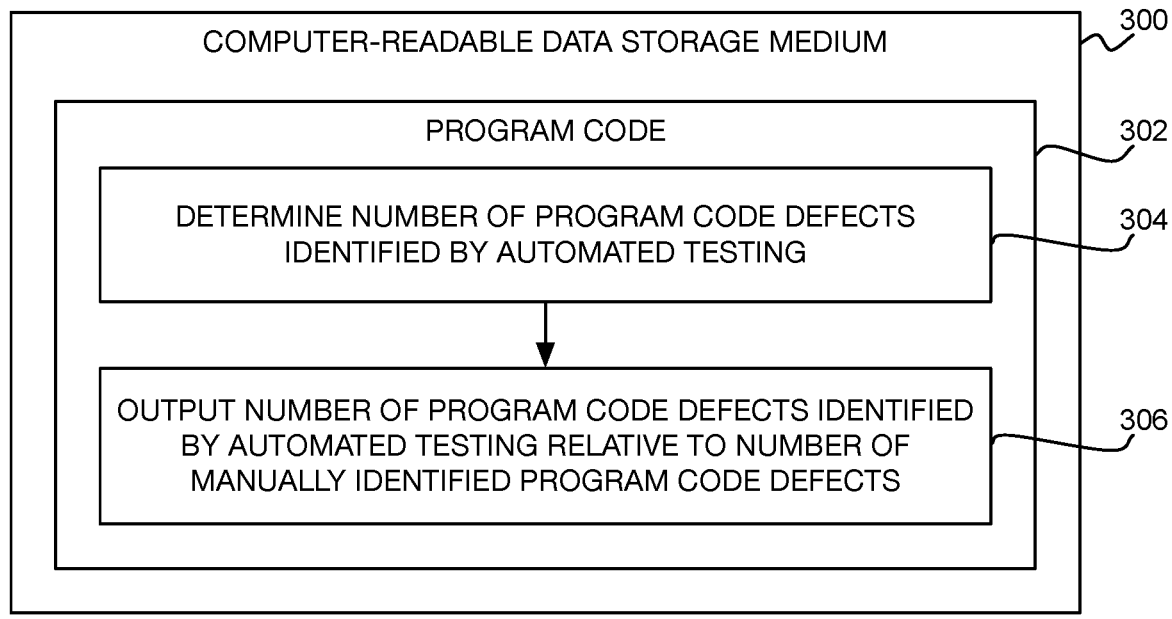
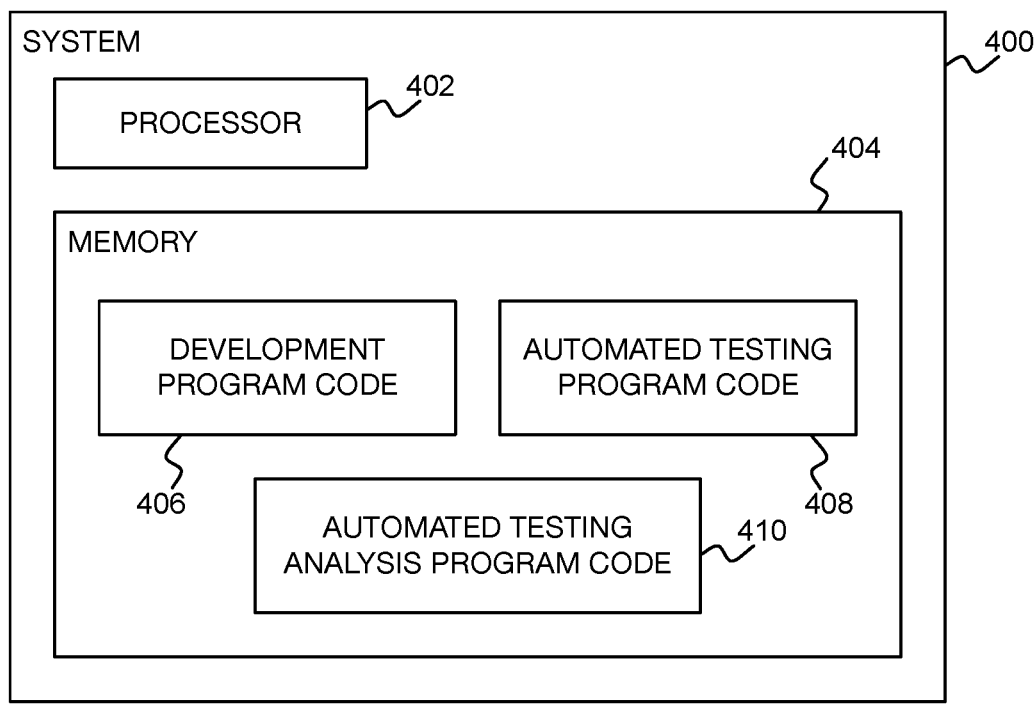

AUTOMATED TESTING OF PROGRAM CODE UNDER DEVELOPMENT

BACKGROUND

As computer programs have become more complex and critical to the functioning of enterprises and other organizations, program code testing has likewise increased in importance to ensure that the code properly operates as intended. In general, there are two types of program code testing. Manual testing involves a tester or other user running program code to verify its proper operation. Manual testing can be laborious, and involve significant resources in terms of human capital and time.

Automated testing, by comparison, uses automated test code separate from the program code being developed to automatically execute the program code and compare the execution results to expected outcomes. Automated testing is particularly paramount in continuous delivery paradigms, in which software is developed in short cycles, as well as in continuous testing paradigms, in which development environment-triggered tests are run in addition to developer or tester-triggered tests.

BRIEF DESCRIPTION OF THE DRAWINGS

FIG. 3 is a diagram of an example computer-readable data storage medium for automated program code testing analysis.

FIG. 4 is a diagram of an example system for program code development, automated program code testing, and automated program code testing analysis.

DETAILED DESCRIPTION

Figure 1:
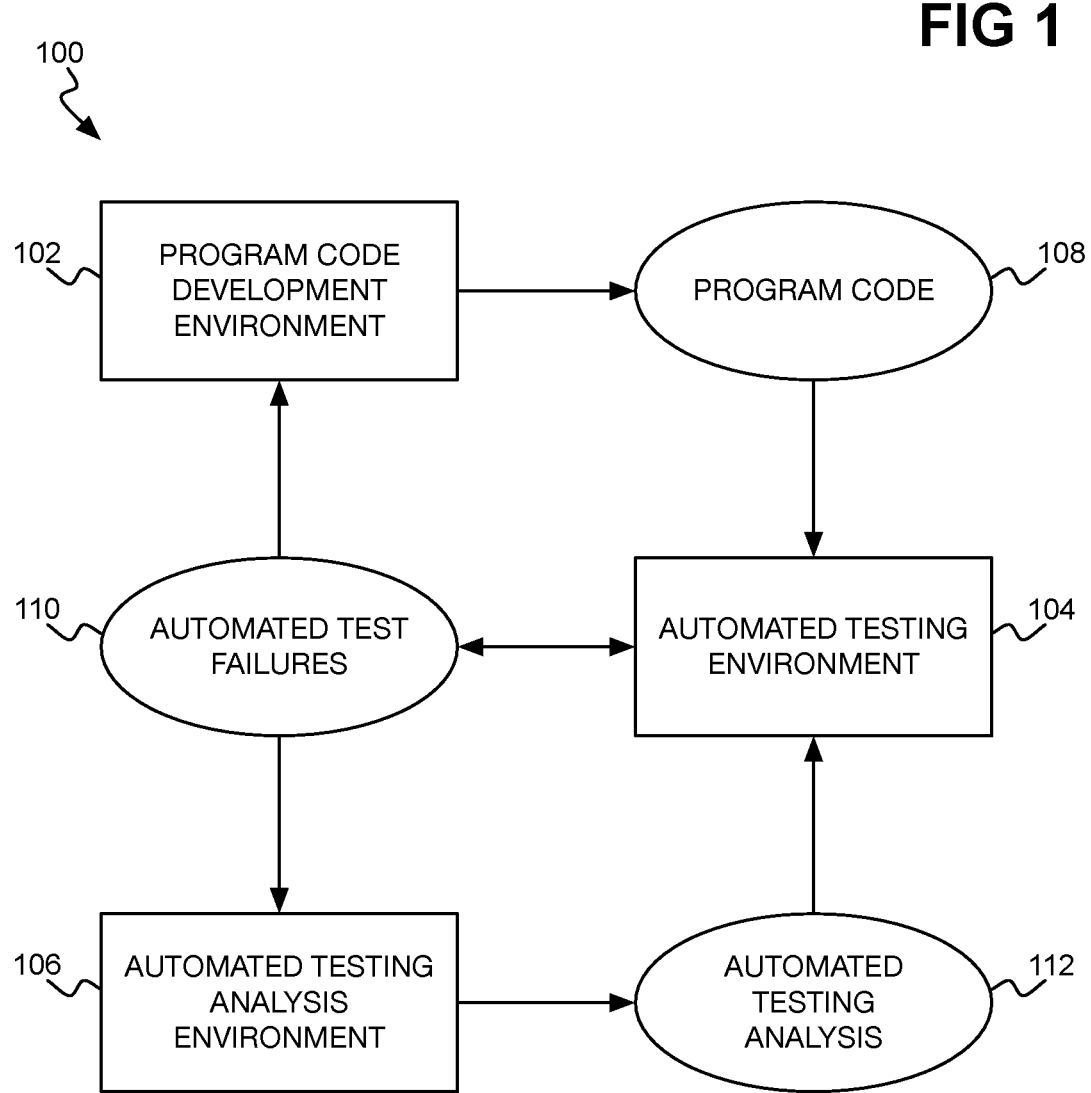
FIG. 1 is a diagram of an example architecture for program code development, automated program code testing, and automated program code testing analysis.

As noted in the background section, in automated testing of program code under development, automated test code separate from the program code automatically executes the program code and compares the execution results to expected outcomes. The developer of the program code can be notified so that identified automated test failures can be resolved. The automated test failures can occur, for instance, due to defects within the program code under development, as well as due to defects within the automated test code and for other reasons.

Whereas automated program code testing can be a boon to reducing the program code development cycle and improving program code quality in terms of reliability and proper operation, such benefits of automated testing accrue only if the automated testing environment in which automated testing occurs is properly put into place. If the automated testing does not properly or adequately test the program code, then the ability of such testing to shorten development cycles and improve code quality is inhibited. This issue is compounded by the fact that automated testing is not an inexpensive proposition, from the standpoint of both monetary cost and time.

Furthermore, it has been found that developers often resolve the automated test failures identified by automated testing of their program code without reporting the failures for subsequent analysis. The result is that whether automated testing is successfully identifying such failures—particularly those occurring due to defects within the program code under development—as well as the impact that automated testing is having on development cycles and code quality is difficult to measure. This in turn can lead to lower adoption rates of automated testing, and increase the likelihood that automated testing will be abandoned after initial adoption.

Techniques described herein ameliorate these and other shortcomings. Automated test failures identified by automated testing of program code under development can be winnowed to just those that have occurred for the first time and that are due to defects within the program code or defects within the automated test code that was executed to perform the automated testing. The remaining automated test failures can be clustered into clusters that each individually correspond to a different automated test code or program code defect. The clusters are then winnowed to include just those corresponding to program code defects.

The resulting clusters thus correspond to individual program code defects that automated testing has identified. The number of such identified defects can be compared to the number of defects identified by manual testing of the program code, with the resulting ratio graphed over time as a benchmark for how successful automated program code testing is in identifying program code defects. The value of automated testing, particularly early in the program code development lifecycle, is therefore more readily apparent, and if automated testing is not identifying as many program code defects as compared to manual testing as expected, the underlying test code can be modified.

FIG. 1 shows an example architecture 100 in which program code development, automated program code testing, and automated program code testing analysis can occur. The architecture 100 can include three environments: a program code development environment 102, an automated testing environment 104, and an automated testing analysis environment 106. The environments 102, 104, and 106 may run on the same or different computing devices or systems. The environments 102, 104, and 106 may each be implemented as one or more computer programs, for instance.

The program code development environment 102 is the environment in which a developer develops program code 108. For instance, the program code development environment 102 may be an integrated development environment (IDE), including editor, compiler, linking, and other tools needed to permit developers to write the program code 108, and transform the program code 108 into an executable version thereof if necessary. For example, the program code 108 may be written in a programming language that is compiled for execution, or in a language that is interpreted at runtime and therefore does not have to be compiled.

The automated testing environment 104 is the environment in which automated testing of the program code 108 occurs. For example, the automated testing environment 104 can be provided by the application lifecycle management (ALM) Octane platform, which is available from Micro Focus International plc, of Newbury, Berkshire, England. The automated testing environment 104 includes automated test code that is executed to test the program code 108 in an automatic manner—i.e., without user interaction. The automated testing of the program code 108 can be triggered according to a temporal schedule, according to build cycle completion of the program code 108, and so on.

The output of the automated testing of the program code 108 within the automated testing environment 104 includes the logging of automated test failures 110. Each time an automated test of the program code 108 as performed by execution of the automated test code fails, an automated test failure 110 is logged. An automated test failure 110 can occur due to a variety of different reasons, and not just due to defects within the program code 108—i.e., program code defects. For instance, an automated test failure 110 can occur due to defects within the automated test code itself, indicating that the test code was not properly specified to test the program code 108. Such a test code defect is not indicative of a defect within the program code 108.

As another example, an automated test failure 110 can occur due to issues pertaining to the automated testing environment 104 itself. For instance, the processing, memory, networking, and other underlying hardware or software of the automated testing environment 104 may have failed, resulting in an automated test failure 110 that is not indicative of a defect within the program code 108. As a further example, an automated test failure 110 can pertain to instability of the automated testing.

For example, the test code that is run to perform automated testing of the program code 108 under development may not properly handle race conditions, such that two or more operations are attempted to be performed by the automated testing at the same time instead of in the proper sequence. In such cases, the automated testing may sometimes succeed and at other times fail, even though neither the test code nor the program code 108 was modified. Therefore, an automated test failure 110 in such an example thus pertains to instability of the automated testing.

The developer of the program code 108, or a tester of the program code 108, may modify how the program code 108 is tested within the automated testing environment 104 based on the automated test failures 110. For instance, if an automated test failure 110 is due to a test code defect and not a program code defect, the test code that is executed to perform automated testing of the program code 108 may be modified so that the failure 110 no longer occurs. If an automated test failure 110 is due to an underlying hardware or software issue of the automated testing environment 104, the issue may be resolved so that the failure 110 no longer occurs.

Furthermore, the developer of the program code 108 may modify the program code 108 itself within the program code development environment 102 based on the automated test failures 110. Specifically, if an automated test failure 110 is due to a program code defect, then the developer can locate the defect within the program code 108 causing the automated test failure 110. Once the program code 108 has been updated in this respect, further automated testing of the program code 108 within the automated testing environment 104 can occur in an iterative manner, to verify that that the automated test failure 110 in question no longer occurs.

Analysis of the automated test failures 110 is also performed, within the automated testing analysis environment 106, resulting in automated testing analysis 112. An example of how such analysis is performed is described in detail later in the detailed description, in reference to FIGS. 2A, 2B, and 2C in particular. In general, the automated testing analysis 112 can determine the number of unique program code defects identified by automated testing of the program code 108 under development, in relation to the number of unique program code defects identified by manual testing of the program code 108, which a tester of the program code 108 may manually report.

The automated testing analysis 112 can include tracking the ratio of the number of automated testing-identified program code defects to the number of manually identified program code defects over time, as testing of the program code 108 occurs. This information is thus indicative of the value of automated testing, particularly in the early development stages of the program code 108. In general, the sooner that a program code defect is located and fixed, the less impact the defect has on the program code 108 as a whole. For instance, if a program code defect is not identified until late in the development cycle, fixing the defect within the program code 108 can cause more issues within the code 108, in cascading fashion, that have to be resolved.

Furthermore, automated testing of the program code 108 within the automated testing environment 104 may be modified based on the automated testing analysis 112. For example, the ratio of the number of program code defects identified by the automated testing to the number of manually identified program code defects may not be as large as expected. This in turn can be indicative that the automated testing of the program code 108 has not been properly established. For instance, the automated testing may not be testing the correct operational flows of the program code 108 that would otherwise result in automated test failures 110.

Figure 2A:
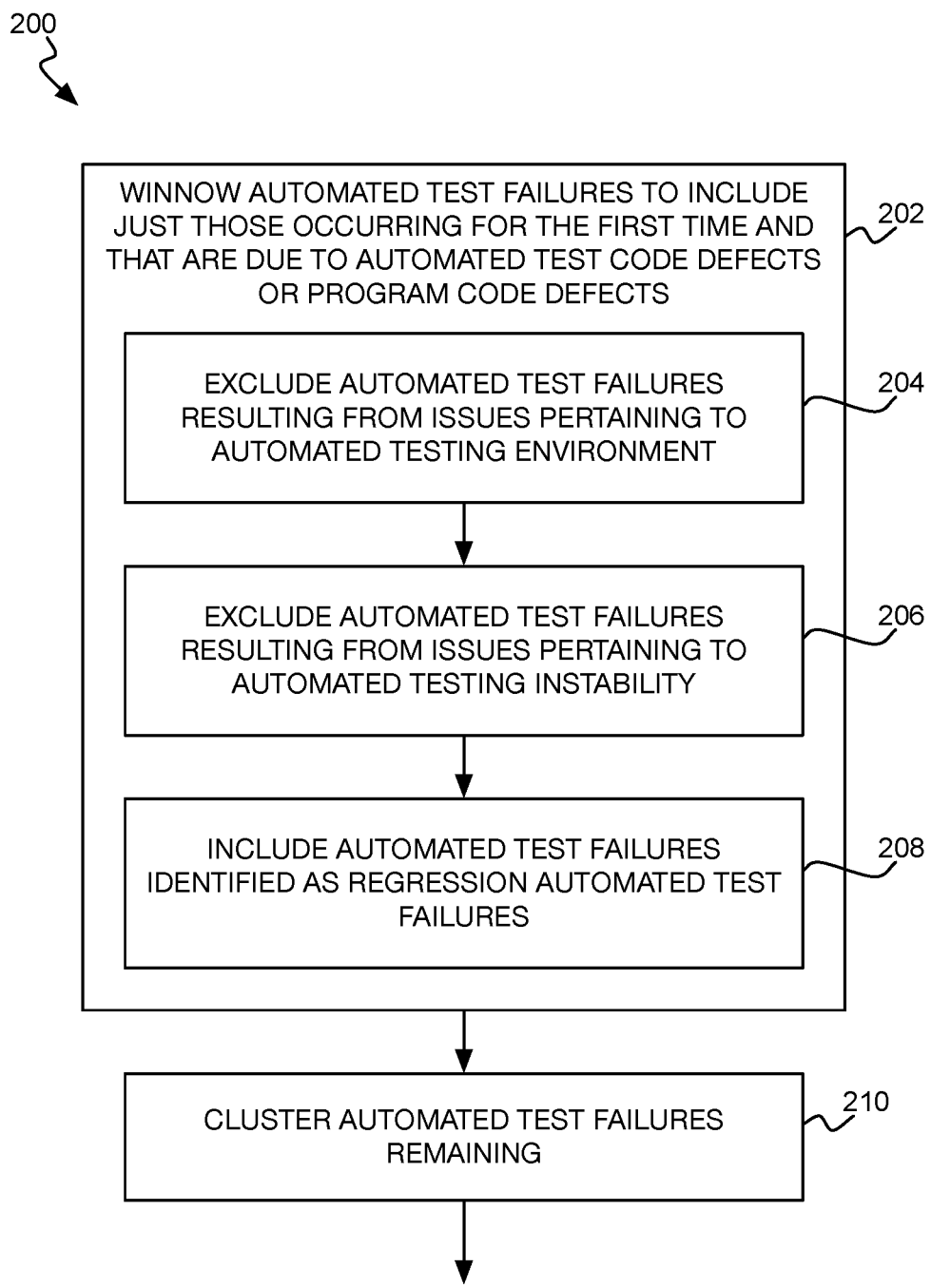
FIGS. 2A, 2B, and 2C are flowcharts of an example method for analyzing and improving automated testing of program code under development.
Figure 2B:
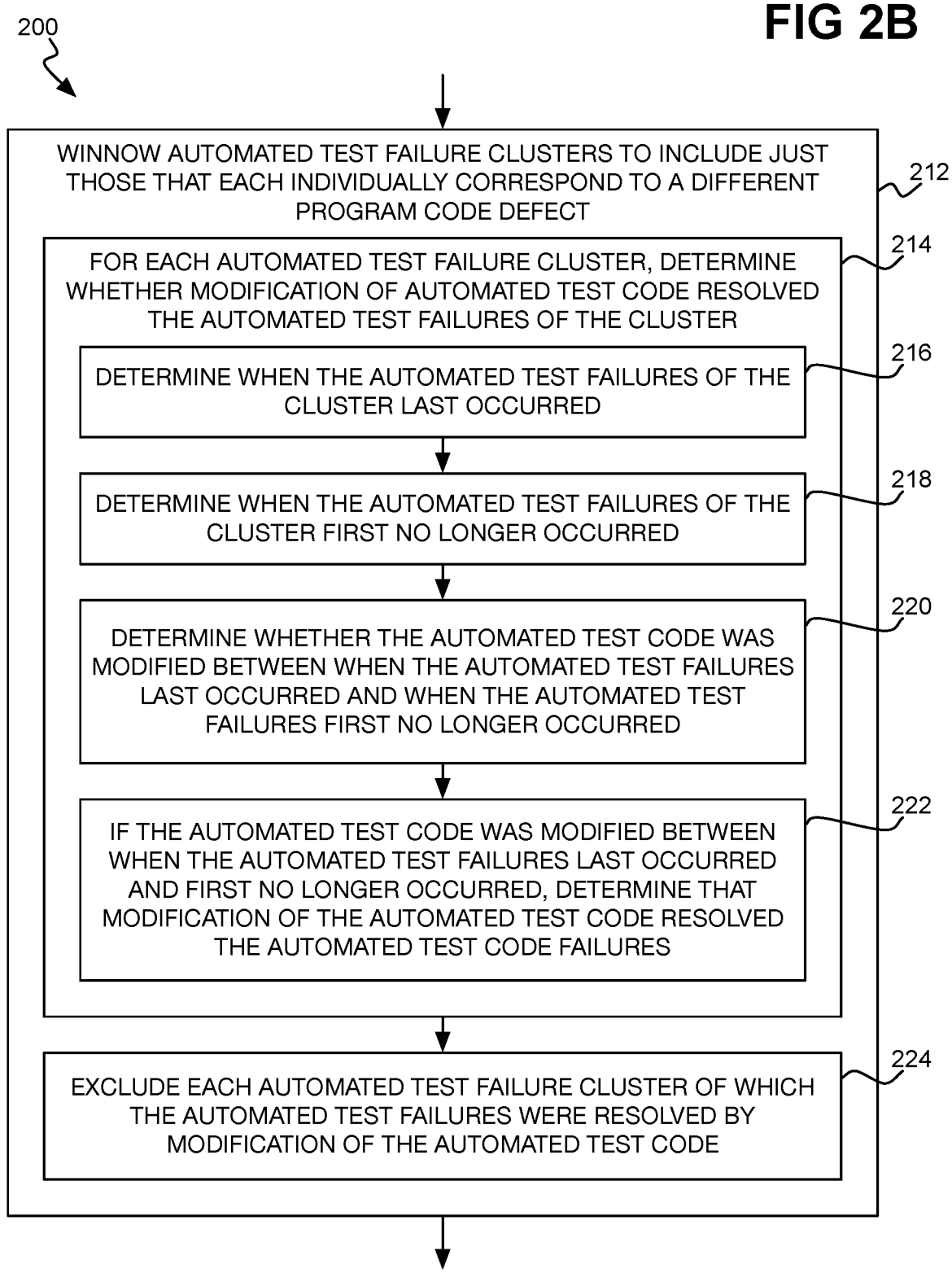
Figure 2C:
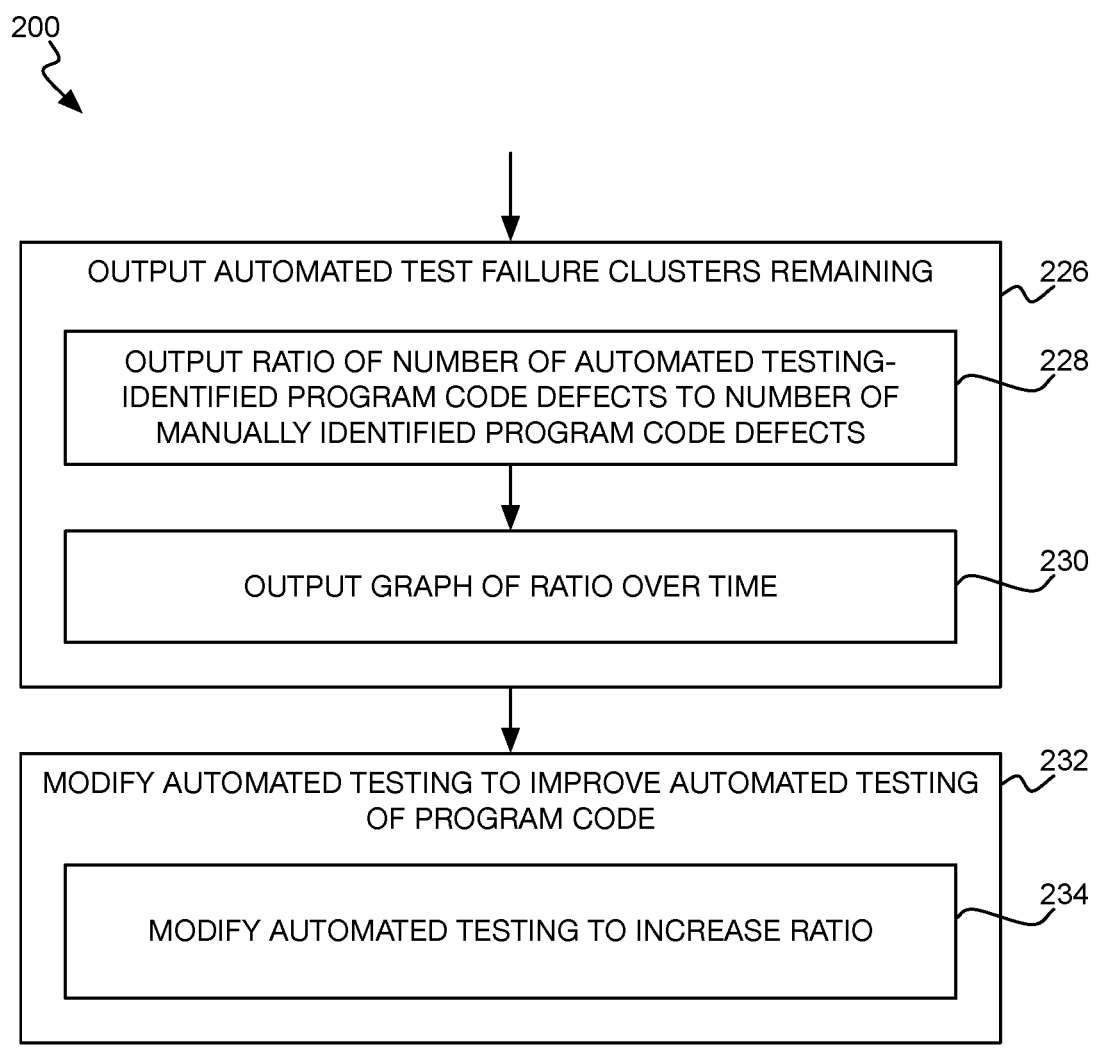

FIGS. 2A, 2B, and 2C show an example method 200 for analyzing and improving automated testing of program code under development. As to the architecture 100 of FIG. 1, for instance, the method 200 can be performed within the automated testing analysis environment 106 in relation to automated test failures 110 identified by automated testing of the program code 108 within the automated testing environment 104. The method 200 can be implemented as automated testing analysis program code stored on a non-transitory computer-readable data storage medium and executed by a processor of a computing device.

The method 200 includes winnowing automated test failures to include just those occurring for the first time and that are due to automated test code defects of program code defects (202). The automated test failures are identified by automated testing of the program code under development. Automated testing of the program code is performed by running automated test code. Automated test code defects are defects within the automated test code, whereas program code defects are defects within the program code under development.

Automated test failures can also result due to issues other than program code defects and automated test code defects, such as due to environmental issues and instability issues as noted above. Furthermore, until the underlying issue of an automated test failure is resolved, each time the program code undergoes automated testing another automated test failure due to the same issue will result. For example, until a program code defect is resolved, an automated test failure due to the program code defect will occur each time the program code undergoes automated testing.

In one implementation, the automated test failures winnowed in part 202 are identified and resultantly logged by the automated testing environment provided by the application lifecycle management (ALM) Octane platform referenced above. Such a logged automated test failure can include a timestamp of when an automated test was run, as well as identification of the automated test that was run to test the program code under development. A logged automated test failure can include whether the automated testing environment has identified the failure as a regression such failure, meaning that this is the first time the automated test in question has failed. For example, a logged automated test failure may provide a failure age, with an age equaling one indicating that this is the first time the corresponding automated test has failed.

A logged automated test failure can further include status information of the automated testing environment itself at the time the test failure occurred. For example, such status information can indicate the availability of various hardware resources within the automated testing environment, such as the operational capacity of processors, memory, and network resources, at the time the test failure occurred. The status information can include the availability of software resources, such as drivers and other operating system components, as well as web browsing and other computer programs, when the failure occurred.

A logged automated test failure can further include status information regarding the automating testing itself that was performed and that resulted in the failure. For example, such status information can include race conditions that occurred during the automated testing, and other indications of testing instability. More generally, the status information may indicate that the automated testing that was performed and that resulted in failure at other times did not result in failure, even though the test code and the program code under development have not been modified.

In one implementation, part 202 of the method 200 can be implemented as follows. Automated test failures resulting from issues pertaining to the automated testing environment in which the automated testing of the program code under development was conducted are excluded (204), or removed. For example, a logged automated test failure may itself indicate that the failure occurred due to an environmental issue. As another example, a logged automated test failure may include status information regarding the automated testing environment, as noted above.

In the latter instance, each piece of status information can be compared to a corresponding threshold to determine whether the status information is indicative of an underlying automated testing environment issue. For example, the status information may indicate that the operational capacity of the memory of the automated testing environment at the time the automated test failure occurred was greater than 95% usage. Such a high usage rate of the memory may be considered as indicative of an issue pertaining to the automated testing environment, and therefore the automated test failure in question is excluded from further consideration.

Automated test failures resulting from issues pertaining to instability of the automated testing of the program code under development are likewise excluded (206), or removed. For example, a logged automated test failure may itself indicate that the failure occurred due to an automated testing instability issue. As another example, a logged automated test failure may include status information regarding the automated testing that was performed and that resulted in the failure, as noted above. In such instance, each piece of status information can be analyzed to determine whether the information is indicative of an underlying automated testing instability issue.

For example, the status information may be binary or Boolean in nature, indicating whether, for instance, there were race conditions when the automated testing was performed when the automated test failure occurred. In this case, if there were race conditions, then this may be considered as indicative of an issue pertaining to automated testing instability, and the automated test failure in question excluded from further consideration. As another example, the status information may indicate the number of race conditions that were encountered, such that the automated test failure is excluded if the number is greater than a specified threshold.

The race conditions may be due to the automated testing not ensuring that operations are performed in the proper sequence. For instance, if one operation is predicated on another operation, then performing the former operation without waiting for the latter to complete can result in a race condition. The race conditions may further result from underlying hardware issues, such as memory leaks, and so on, which result in an operation predicated on another operation being performed before the latter operation has finished execution.

Just automated test failures that have been identified as regression such test failures may be included (208). That is, automated test failures that have not been identified as regression failures may be excluded from further consideration. As noted above, regression test failures are automated test failures that have occurred for the first time. Subsequent recurrences of an automated test failure due to the underlying issue not being resolved are thus removed so as not to overstate the number of program code defects that automated testing identifies. (It is noted that different automated test failures may result from the same or different program code defects; automated test failures resulting from the same defect are clustered, as is described later in the detailed description.)

For example, a program code defect may be a low priority defect that is not resolved over multiple build cycles of the program code under development and thus remains unresolved over successive instances of automated testing. Each time the program code under development is tested, an automated test failure due to the program code defect will therefore be logged until the defect is resolved. If all the automated test failures were considered, then the program code defect may be counted as multiple defects identified by automated testing, and not as just one program code defect.

The method 200 includes clustering the remaining automated test failures (210), after part 202 is performed. That is, the automated test failures that are clustered are those that occurred for the first time and that are due to automated test code defects or program code defects. However, at the time of clustering, whether an automated test failure is due specifically to an automated test code defect or to a program code defect may not be known. Rather, both types of automated test failures that occurred for the first time can be clustered without first distinguishing between the two. The clustering can be performed using a k-means or another clustering technique.

Clustering can be performed based on features or characteristics of the automated test failures as provided by the automated testing environment when logging the failures. For example, such features or characteristics of an automated test failure can include the information noted above, such as a timestamp when the failure occurred and identification of the automated test that was run on the program code and which resulted in the failure, as well as various status information regarding the automated testing environment and/or the automated testing itself.

Clustering may additionally or instead be performed based on error stack traces of automated tests that resulted in automated test failures. An error stack trace can include the method calls that the program code under development made during automated testing. A similarity method may be run on the error stack traces of the automated tests resulting in failure to identify automated test failures that have high similarity, which can then be grouped within the same cluster.

The clusters into which the automated test failures are clustered each correspond to a different program code defect or a different automated test code defect. Multiple automated test failures can result from the same program code or automated test code defect, even with respect to test failures that have each occurred for the first time. For example, different automated tests can be run by executing different automated test code, and result in corresponding separate automated test failures. However, the same underlying program code defect within the program code under development may cause failure of these different automated tests.

As another example, an automated test can be run by executing corresponding automated test code, but result in different types of and thus multiple automated test failures. In some cases, the automated test failures may all be the due to the same underlying defect within the automated test code that was run. In other cases, the same underlying program code defect may cause these automated test failures. The clustering of part 210 thus generates automated test failure clusters that each correspond to a different defect, be it a program code defect or an automated test code defect.

The method 200 includes then winnowing the automated test failure clusters to include just those that each individually correspond to a different program code defect (212). Stated another way, the automated test failure clusters that each individually correspond to a different automated test code defect are excluded. In one implementation, part 212 of the method 200 can be implemented by, for each cluster, determining whether modification of the automated test code resolved the automated test failures of the cluster (214). For instance, when these automated test failures of the cluster last occurred may be determined (216), as well as when they first no longer occurred (218).

In one implementation, when the automated test failures of a cluster last occurred is determined as the most recent timestamp of any automated test failure of the cluster. When each automated test failure occurred can be determined from the timestamp logged with the automated test failure. When the automated test failures of the cluster first no longer occurred can be determined as the time when the automated test of the program code that had resulted in the failure having the timestamp in question is next performed. The automated testing environment, for instance, may log when each automated test of the program code is performed, regardless of whether the automated test results in failure.

Next, whether the automated test code was modified between when the automated test failures of the cluster last occurred and first no longer occurred is determined (220). The automated test code that is considered may be the test code that was executed and that resulted in the automated test failure having the timestamp identified in relation to part 216 as noted above. The developer or tester may specify which automated test code corresponds to which automated tests. The modification dates of the files for the automated test code can be examined to determine if any such file was modified between when the test failures last occurred and first no longer occurred.

If the automated test code was modified between when the automated test failures of the cluster last occurred and first no longer occurred, then the method 200 determines that modification of the automated test code resolved the automated test failures of the cluster (222). That is, the modification of the automated test code between when the automated test failures of the cluster last occurred and then no longer occurred is assumed to have resolved the automated test failures. As such, the automated test failures of the cluster are deemed as having been due to an automated test code defect that was then resolved, as opposed to a program code defect of the program code under development.

Once part 214 has been performed for each automated test failure cluster, the method 200 includes excluding each cluster having automated test failures resolved by modification of the automated test code (224). That is, the clusters including automated test failures resulting from automated test code defects are excluded or removed from further consideration. The automated test failure clusters that remain are thus assumed to be, by process of elimination, those including automated test failures that are due to program code defects within the program code under development, without actually identifying the failures as such.

The method 200 includes outputting the automated test failure clusters that remain (226), which as noted are those that have been deemed as resulting from program code defects within the program code under development. Outputting the automated test failure clusters that remain can include the following. A ratio of the number of automated test failure clusters to the number of manually identified program code defects within the program code can be output (228). This ratio corresponds to a ratio of the number of automated testing-identified program code defects within the program code to the number of manually identified program code defects.

The number of manually identified program code defects for the same period of time and for the same area of the program code in which automated testing of the program code was performed can be provided as manually reported by a tester or a developer during manual testing of the program code. For example, when a tester manually executes the program code and determines whether its output matches the expected or predicted behavior, the tester may log when he or she has uncovered a manual test error, such as within a bug tracking system. As the bugs are resolved by the developer, the developer may indicate the cause of the error, such as whether the error resulted from a program code defect or due to another reason.

Therefore, the bug tracking or other system can be queried to identify the manual test errors that are due to program code defects within the program code undergoing development. In turn, the number of unique program code defects identified by the manual test errors can be counted and used as the denominator within the aforementioned ratio. More generally, the method 200 can in part 228 output the number of program code defects identified within the program code by automated testing relative to the number of manually identified program code defects, be it in the form of a ratio or in another manner.

The method 200 can further include outputting the graph of the determined ratio of automated testing-identified program code defects to the number of manually identified program code defects over time (230). For example, automated as well as manual testing of the program code under development may occur at regular periodic intervals, or may occur as specified build versions of the program code have been developed. The graph of the ratio over time thus indicates how the number of program code defects identified by automated testing relative to the number of manually identified program code defects varies over time.

The method 200 may include modifying the automated testing of the program code under development (232). Specifically, the automated testing may be modified to increase the ratio of automated testing-identified program code defects to the number of manually identified program code defects. The determined ratio can generally indicate the value of the automated testing of the program code under development. However, if the ratio is less than expected—meaning that automated testing is not identifying as many program code defects as expected relative to manual testing—then the automated testing of the program code may be modified. The ratio being less than expected may further mean that the automated testing is not testing the correct operational flows of the program code to properly detect program code defects.

For example, different or additional automated tests, having associated different automated test code, may be developed or specified. As another example, the automated test code of the automated tests that have already been run may be modified. Automated testing modification is performed so that such testing is more likely to identify program code defects within the program code. The modification may itself be performed in an automated or manual manner. For example, further automated tests of the program code may automatically be added if the ratio is less than a threshold, a developer or tester may manually modify the automated test code of existing tests, and so on.

FIG. 3 shows an example non-transitory computer-readable data storage medium 300 storing program code 302 executable by a processor, such as a processor of a computing device within the automated testing analysis environment 106 of FIG. 1. The program code 302 is executed to perform processing, including determining a number of program code defects identified within program code under development by automated testing (304). The processing further includes outputting the number of program code defects identified within the program code by the automated testing relative to a number of manually identified program code defects (306).

FIG. 4 shows an example system 400. The system 400 can implement the architecture 100 of FIG. 1 in one implementation. The system 400 includes a processor 402 and a memory 404 storing program code executable by the processor 402. The program code includes development program code 406, automated testing program code 408, and automated testing analysis program code 410, which can respectively implement the program code development environment 102, the automated testing environment 104, and the automated testing analysis environment 106 of FIG. 1.

The development program code 406 modifies program code under development, such as by a developer. The automated testing program code 408 performs automated testing on the program code under development, such as without user interaction. The automated testing analysis program code 410 determines the number of program code defects identified within program code by the automated testing, and outputs the number of automated testing-identified program code defects relative to a number of manually identified program code defects within the program code.

Techniques have been described herein for analyzing and improving the automated testing of program code under development. The techniques determine the number of unique program code defects that have been identified by automated testing. The number of these program code defects, such as relative to the number of manually identified program code defects, can be used to assess the value of automated testing of the program code. Furthermore, the automated testing can be accordingly modified so it better identifies program code defects within the program code.

We claim:

1. A method comprising:
   winnowing a plurality of automated test failures that result from automated testing of program code under development to include just the automated test failures occurring for a first time and that are due to automated test code defects and program code defects, such that the automated test failures resulting from causes other than the automated test code defects and the program code defects are removed, the automated test code defects being defects within automated test code executed to perform the automated testing of the program code under development, and the program code defects being defects within the program code under development;
   clustering the automated test failures that remain after winnowing into a plurality of automated test failure clusters that each individually correspond to a different automated test code defect or a different program code defect;
   winnowing the automated test failure clusters to include just the automated test failure clusters that each individually correspond to a different program code defect, such that the automated test failure clusters that each individually correspond to a different automated test code defect are removed; and
   outputting the automated test failure clusters that remain after winnowing.

2. The method of claim 1, wherein outputting the automated test failure clusters comprises:
   outputting a ratio of a number of the automated test failure clusters to a number of manually identified program code defects within the program code, as a ratio of a number of automated testing-identified program code defects within the program code to the number of manually identified program code defects.

3. The method of claim 2, wherein outputting the automated test failure clusters further comprises:
   outputting a graph of the ratio of the automated testing-identified program code defects to the number of manually identified program code defects over time.

4. The method of claim 2, further comprising:
   modifying the automated testing of the program code under development to increase the ratio of the ratio of the automated testing-identified program code defects to the number of manually identified program code defects.

5. The method of claim 1, further comprising:
   modifying the automated testing of the program code under development to improve the automated testing.

6. The method of claim 1, wherein winnowing the automated test failures to include just the automated test failures occurring for the first time and that are due to the automated test code defects and the program code defects comprises:
   winnowing the automated test failures to exclude the automated test failures that result from issues pertaining to an environment in which the automated testing of the program code under development was conducted, the issues being failures within hardware of the environment, such that the automated test failures that result from the issues are not indicative of defects within the program code under development.

7. The method of claim 1, wherein winnowing the automated test failures to include just the automated test failures occurring for the first time and that are due to the automated test code defects and the program code defects comprises:
   winnowing the automated test failures to exclude the automated test failures that result from issues pertaining to instability of the automated testing of the program code under development, including an inability of the automated test code in handling race conditions, resulting in multiple operations being performed simultaneously instead of in sequence, such that the automated test failures that result from the issues are not indicative of defects within the program code under development.

8. The method of claim 1, wherein winnowing the automated test failures to include just the automated test failures occurring for the first time and that are due to the automated test code defects and the program code defects comprises:
   winnowing the automated test failures to include the automated test failures identified as regression automated test failures.

9. The method of claim 1, wherein winnowing the automated test failure clusters to include just the automated test failure clusters that each individually correspond to a different program code defect comprises:
   for each automated test failure cluster, determining whether modification of the automated test code that was executed to perform the automated testing of the program code under development resolved the automated test failures of the automated test failure cluster; and
   excluding from the automated failure test clusters each automated test failure cluster of which the automated test failures were resolved by modification of the automated test code, in that each automated test failure cluster of which the automated test failures were resolved by modification of the automated test code is due to an automated test code defect and not due to a program code defect.

10. The method of claim 9, wherein, for each automated test failure cluster, determining whether modification of the automated test code resolved the automated test failures of the automated test failure cluster comprises:
    determining when the automated test failures of the automated test failure cluster last occurred during the automated testing of the program code;
    determining when the automated test failures of the automated test failure cluster first no longer occurred during the automated testing of the program code;
    determining whether the automated test code was modified between when the automated test failures of the automated test failure cluster last occurred and when the automated test failures of the automated test failure cluster first no longer occurred; and
    responsive to determining that the automated test code was modified between when the automated test failures of the automated test failure cluster last occurred and when the automated test failures of the automated test failure cluster first no longer occurred, determining that modification of the automated test code resolved the automated test failures of the automated test failure cluster.

11. A non-transitory computer-readable data storage medium storing program code executable by a processor to:
    winnow a plurality of automated test failures that result from automated testing of program coder under development to include just the automated test failures occurring for a first time and that are due to automated test code defects and program code defects, such that the automated test failures resulting from causes other than the automated test code defects and the program code defects are removed, the automated test code defects being defects within automated test code executed to perform the automated testing of the program code under development, and the program code defects being defects within the program code under development;
    cluster the automated test failures that remain after winnowing into a plurality of automated test failure clusters that each individually correspond to a different automated test code defect or a different program code defect;
    winnow the automated test failure clusters to include just the automated test failure clusters that each individually correspond to a different program code defect, such that the automated test failures that each individually correspond to a different automated test code defect are removed; and
    output the automated test failure clusters that remain after.

12. The non-transitory computer-readable data storage medium of claim 11, wherein the processor is to winnow the automated test failures to include just the automated test failures occurring for the first time and that are due to the automated test code defects and the program code defects by:
    winnowing the automated test failures to exclude the automated test failures that result from issues pertaining to an environment in which the automated testing of the program code under development was conducted, the issues being failures within hardware of the environment, such that the automated test failures that result from the issues are not indicative of defects within the program code under development; and
    winnowing the automated test failures to exclude the automated test failures that result from issues pertaining to instability of the automated testing of the program code under development, including an inability of the automated test code in handling race conditions, resulting in multiple operations being performed simultaneously instead of in sequence, such that the automated test failures that result from the issues are not indicative of defects within the program code under development.

13. The non-transitory computer-readable data storage medium of claim 11, wherein the processor is to winnow the automated test failure clusters to include just the automated test failure clusters that each individually correspond to a different program code defect by:
    for each automated test failure cluster, determining whether modification of automated test code that was executed to perform the automated testing of the program code under development resolved the automated test failures of the automated test failure cluster; and
    excluding from the automated test failure clusters each automated test failure cluster of which the automated test failures were resolved by modification of the automated test code, in that each automated test failure cluster of which the automated test failures were resolved by modification of the automated test code is due to an automated test code defect and not due to a program code defect.

14. The non-transitory computer-readable data storage medium of claim 13, wherein, for each automated test failure cluster, determining whether modification of the automated test code resolved the automated test failures of the automated test failure cluster comprises:
    determining when the automated test failures of the automated test failure cluster last occurred during the automated testing of the program code;
    determining when the automated test failures of the automated test failure cluster first no longer occurred during the automated testing of the program code;
    determining whether the automated test code was modified between when the automated test failures of the automated test failure cluster last occurred and when the automated test failures of the automated test failure cluster first no longer occurred; and responsive to determining that the automated test code was modified between when the automated test failures of the automated test failure cluster last occurred and when the automated test failures of the automated test failure cluster first no longer occurred, determining that modification of the automated test code resolved the automated test failures of the automated test failure cluster.

15. The non-transitory computer-readable data storage medium of claim 11, wherein the processor is to output the automated test failure clusters by:

outputting a ratio of a number of the automated test failure clusters to a number of manually identified program code defects within the program code, as a ratio of a number of automated testing-identified program code defects within the program code to the number of manually identified program code defects.

16. The non-transitory computer-readable data storage medium of claim 15, wherein the processor is to output the automated test failure clusters by further:

outputting a graph of the ratio of the automated testing-identified program code defects to the number of manually identified program code defects over time.

17. A system comprising:

a processor; and a memory storing program code executable by the processor, the program code comprising:

automated testing analysis program code to:

winnow a plurality of automated test failures that result from automated testing of program coder under development to include just the automated test failures occurring for a first time and that are due to automated test code defects and program code defects, such that the automated test failures resulting from causes other than the automated test code defects and the program code defects are removed, the automated test code defects being defects within automated test code executed to perform the automated testing of the program code under development, and the program code defects being defects within the program code under development;

cluster the automated test failures that remain after winnowing into a plurality of automated test failure clusters that each individually correspond to a different automated test code defect or a different program code defect;

winnow the automated test failure clusters to include just the automated test failure clusters that each individually correspond to a different program code defect, such that the automated test failures that each individually correspond to a different automated test code defect are removed; and output the automated test failure clusters that remain after winnowing.

18. The system of claim 17, wherein the program code further comprises:

automated testing program code to perform the automated testing on the program code under development; and development program code to modify the program code under development.

19. The system of claim 17, wherein the automated testing analysis program code is to winnow the automated test failures to include just the automated test failures occurring for the first time and that are due to the automated test code defects and the program code defects by:

winnowing the automated test failures to exclude the automated test failures that result from issues pertaining to an environment in which the automated testing of the program code under development was conducted, the issues being failures within hardware of the environment, such that the automated test failures that result from the issues are not indicative of defects within the program code under development; and winnowing the automated test failures to exclude the automated test failures that result from issues pertaining to instability of the automated testing of the program code under development, including an inability of the automated test code in handling race conditions, resulting in multiple operations being performed simultaneously instead of in sequence, such that the automated test failures that result from the issues are not indicative of defects within the program code under development.

20. The system of claim 17, wherein the automated testing analysis program code is to winnow the automated test failure clusters to include just the automated test failure clusters that each individually correspond to a different program code defect by:

for each automated test failure cluster, determining whether modification of automated test code that was executed to perform the automated testing of the program code under development resolved the automated test failures of the automated test failure cluster; and excluding from the automated test failure clusters each automated test failure cluster of which the automated test failures were resolved by modification of the automated test code, in that each automated test failure cluster of which the automated test failures were resolved by modification of the automated test code is due to an automated test code defect and not due to a program code defect.

* * * * *